United States Patent [19]

Crampton

[11] Patent Number: 4,848,202
[45] Date of Patent: Jul. 18, 1989

[54] CUT OFF OR CROSS PERFORATOR OR SCORING CYLINDER WITH QUICK BLADE RELEASE

[75] Inventor: C. Philip Crampton, Hamilton, Ohio
[73] Assignee: The Hamilton Tool Company, Hamilton, Ohio
[21] Appl. No.: 114,616
[22] Filed: Oct. 29, 1987
[51] Int. Cl.⁴ .............................................. B26D 1/62
[52] U.S. Cl. ........................................ 83/343; 83/674; 83/698
[58] Field of Search ............... 83/663, 673, 674, 677, 83/343, 698; 144/230

[56] References Cited

U.S. PATENT DOCUMENTS

| | | | |
|---|---|---|---|
| 2,341,503 | 2/1944 | Bombard . | |
| 3,196,724 | 7/1965 | Frank . | |
| 3,705,526 | 12/1972 | Bishop | 83/698 |
| 3,769,868 | 11/1973 | Hornung | 83/674 X |
| 3,822,625 | 7/1974 | Obenshain | 83/342 |
| 3,865,164 | 2/1975 | Sybertz | 83/698 X |
| 3,989,077 | 11/1976 | Humbert | 144/230 |
| 4,074,599 | 2/1978 | Allen | 83/346 |
| 4,187,753 | 2/1980 | Walde | 83/674 |
| 4,392,402 | 7/1983 | Rann | 83/674 X |
| 4,594,928 | 6/1986 | Thomas et al. | 144/230 X |

FOREIGN PATENT DOCUMENTS 878556 10/1961 United Kingdom .

Primary Examiner—Frank T. Yost
Assistant Examiner—Hien H. Phan
Attorney, Agent, or Firm—Wood, Herron & Evans

[57] ABSTRACT

A cut off, cross perforator or scoring cylinder having a quick relese mounting for a cross-cutting or perforating blade is disclosed, hereafter called cylinder. The blade is mounted in a longitudinal groove in the periphery of the cylinder. It is held in place against a side wall of the groove by means of a retaining bar which is disposed within the groove. The retaining bar is normally urged against the blade by compression springs. In order to change blades, the retaining bar is pivoted away from the blade by means of an operating lever having pins insertable in openings in the outer wall of the retaining bar. This frees the blade for removal and enables insertion of a new blade. Endwise clamps are provided with resilient pads interposed between the clamps and the retaining bar to support the retaining bar against dislodgement while permitting pivotal movement thereof.

10 Claims, 1 Drawing Sheet

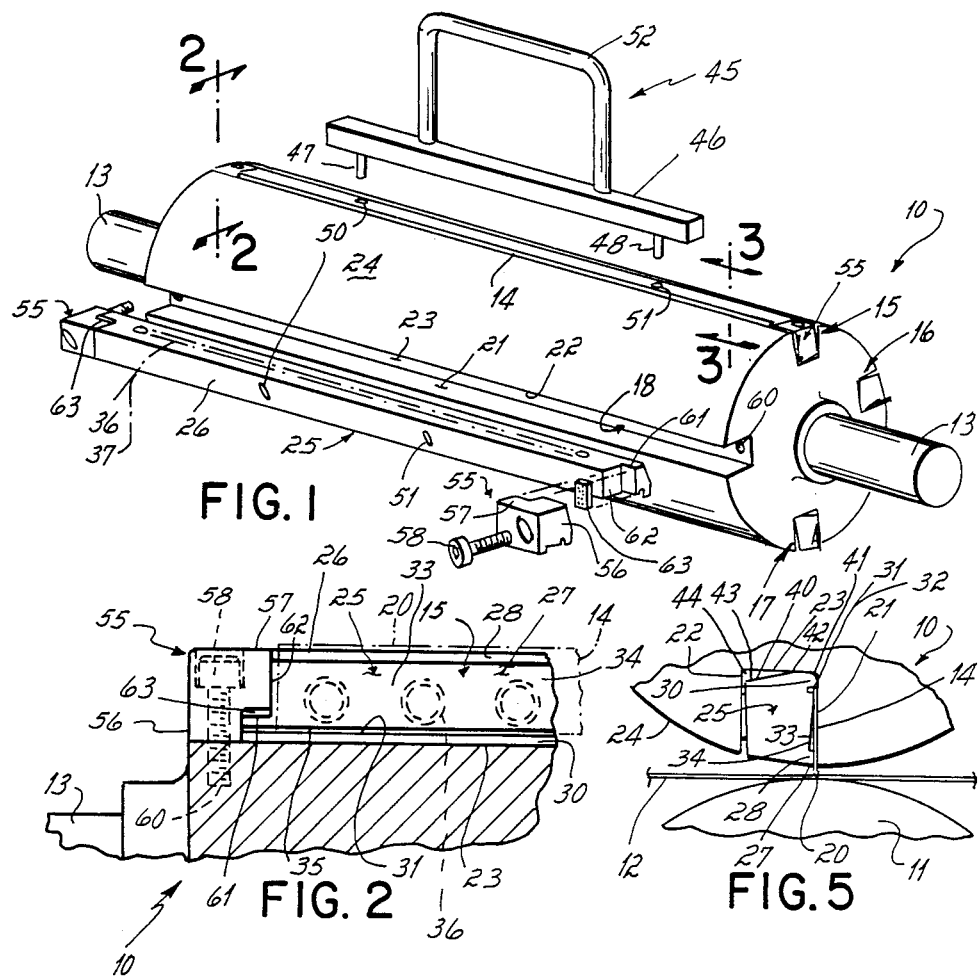
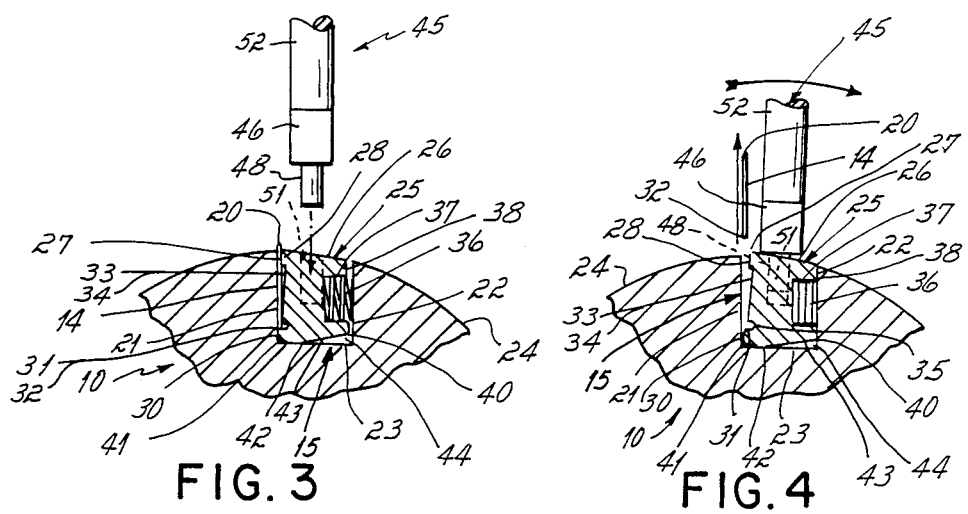

CUT OFF OR CROSS PERFORATOR OR SCORING CYLINDER WITH QUICK BLADE RELEASE

BACKGROUND OF THE INVENTION

The present invention relates to cylinders for cross-cutting, cross-perforating, or scoring a web material, such as paper, cloth, plastic, fabric, or the like, in collators, presses and other machines. Cylinders of the type with which the present invention is concerned are provided with at least one longitudinally-extending peripheral groove which carries a blade. The blade protrudes slightly from the circumference of the knife cylinder and engages a rotary cylinrical anvil mounted for rotation about an axis parallel to the axis of rotation of the cylinder. The blade functions to either cut the web into separate sheets, to perforate the web along transverse lines to facilitate its subsequent folding and separation into sheets, or scoring.

Blades of the type in question wear out very rapidly and, in may installations, must be replaced every day or two. Since the replacement of blades requires shutting down a very large piece of equipment, it is desirable to provide means for changing the blades as quickly as possible. In the past, however, no completely satisfactory construction has been provided for accomplishig this result.

In one commercially-employed cylinder construction, the blade is clamped against a side wall of the groove by means of a clamp bar positioned by several transverse bolts. In installing the blade, it is initially positioned so that it extends slightly beyond the periphery of the cylinder and the bolts associated with the clamp bar are partially tightened. Thereafter, the cylinder is rotated to bring the blade into contact with the rotary anvil. This contact shifts the blade into its correct position. The blade is then locked in this position by tightening the clamping bolts.

In a second construction, a wedge-shaped clamp bar is mounted in the groove and set screws, or bolts, which can be turned from the periphery of the clamp bar, are turned to force the clamp bar against the blade to wedge the blade against a side wall of the groove. Blades are installed in this modified design in the same manner described above.

In a third commercial form of cylinder, an accurately dimensioned blade is employed which has a cutting edge parallel to the bottom edge of the blade. In this embodiment, the bottom edge of the blade rests against a shoulder on a clamping block. In this arrangement the height of the blade is set automatically, eliminating the need for adjustment by rotation of the knife cylinder. This embodiment, however, still requires manipulation of a plurality of clamping bolts to secure the blade in position.

The principal difficulty with each of the embodiments described above is that they require an inordnate amount of time, i.e., from 3-5 minutes, to replace a blade. Other constructions have been proposed for mounting blades to effect a more rapid release. However, these constructions have the disadvantage that they are either unduly complex or are unsuited for the type of equipment with which the present cylinder construction is used.

Thus, for example, Thomas et al U.S. Pat. No. 4,594,928 discloses a knife cylinder in which the blades are clamped in position by means of a mounting member which presses the blades against a side wall of a groove in the knife cylinder. The knives are held in place by a link which is in turn engaged by a pressure cylinder.

Hornung U.S. Pat. No. 3,769,868 discloses a rotary cutting blade which is held in place by a mounting block biased toward the blade by means of expandable tubes subjected to pneumatic pressure.

Other blade-mounting construction are shown in several prior art patents. For example, Bombard U.S. Pat. No. 2,341,503 discloses a blade which is frictionally held in place by a plurality of spring-biased bores.

Walde U.S. Pat. No. 4,187,753 and Bishop U.S. Pat. No. 3,705,526 disclose rotary knife blade-mounting constructions in which the blades are held in position by compressible pads or chocks mounted on studs parallel to the plane of the blade.

Sybertz U.S. Pat. No. 3,865,164 discloses a blade mounting for a wood comminuting machine. The blade is retained in a slot by cooperating wedges, one of which is spring-biased. The blade is secured by a plurality of mounting screws to one of the wedges, requiring that these screws be loosened to replace the blade.

Humbert U.S. Pat. No. 3,989,077 discloses a rotary knife-mounting construction in which the knife is held in place by means of a permanent magnet.

Obenshain U.S. Pat. No. 3,822,625 discloses a rotary knife blade which is frictionally held in a block which carries a plurality of clamping screws which must be turned to replace a blade.

Rann U.S. Pat. No. 4,392,402 discloses a rotary knife blade-mounting construction in which the blade is held in place by wedge-shaped retaining members which are bolted to the drum.

SUMMARY OF THE INVENTION

It is the principal object of the present invention to provide a cylinder construction in which a blade is firmly and accurately held in its proper position relative to the periphery of the cylinder and in which a worn blade can be quickly and easily removed and replaced. Indeed, in a machine equipped with a blade cylinder of the present invention, a blade can be replaced in approximately ten seconds as compared to the three to five minutes regularly required to replace a blade on present commercial machines.

It is a further object of the present invention to provide a blade-mounting construction which is simple and inexpensive in construction and which is extremely simple to manipulate.

More particularly, the present invention contemplates a cylinder having one or more peripheral grooves extending parallel to the axis of the cylinder. The groove includes two side walls and a bottom wall. A retainer bar is mounted within the groove, the retainer bar being configurated so that it can be pivoted toward and away from one side wall of the groove. The front wall of the retainer bar includes a lower support shoulder which engages the lower edge of a blade inserted in the groove between the retainer bar and adjacent side wall of the groove. This lower shoulder on the retainer bar supports the blade so that the blade's cutting edge projects just the proper amount beyond the periphery of the cylinder.

The retainer bar also presses the blade against the side wall of the groove to frictionally retain the blade in position. To this end compression springs are interposed between a second side wall of the groove and the retainer bar to urge the retainer bar against the blade. A removable operating lever member, including pins engaging openings in the outer surface of the retainer bar, is used to pivot the retainer bar away from the blade to a "release" position in which the blade can be lifted free of the slot in the cylinder. To change a blade, the old blade is removed by pivoting the retainer bar to the "release" position. A new blade is dropped into the groove until the blade contacts the lower shoulder on the retainer bar and, thereafter, the retainer bar is released to clamp the new blade in place under the influence of the compression springs.

In a preferred embodiment of the invention, the retainer bar is held in the groove against outward movement by means of two L-shaped clamps which fit over the endwise shoulders of the retainer bar with a resilient pad being inserted between the clamps and bar to permit limited pivotal movement of the bar.

The principal advantage of the present knife blade construction is that it permits extremely rapid blade replacement, i.e., a blade can be replaced in a matter of 20 seconds.

Another advantage of the present blade construction is that it is extremely simple and relatively economical to produce.

Yet another advantage of the present blade construction is that it is simple to manipulate. Moreover, it minimizes the possibility that a blade will be improperly positioned in the knife cylinder or that an insufficient, or excessive, clamping pressure will be applied due to the improper adjustment of adjustment bolts as used in prior art knife-mounting arrangements.

These and other objects and advantages of the present invention will more readily be apparent from the following detailed description of a preferred embodiment of the invention.

BRIEF DESCRIPTION OF THE DRAWINGS

FIG. 1 is a perspective, partially exploded view of a cylinder and operating lever embodying the present invention.

FIG. 2 is a cross-sectional view taken along line 2—2 of FIG. 1.

FIG. 3 is a cross-sectional view taken along line 3—3 of FIG. 1.

FIG. 4 is a cross-sectional view similar to FIG. 3 showing the operating lever canting the retaining bar to permit removal of the blade.

FIG. 5 is a fragmentary end view showing a rotary knife cylinder and a cooperating rotary anvil.

DESCRIPTION OF A PREFERRED EMBODIMENT

A preferred embodiment of a blade cylinder 10 is shown in FIG. 1 and the manner in which such a cylinder cooperates with a rotary anvil 11 to cross-cut or cross-perforate a web of material 12 is illustrated in FIG. 5. More particularly, in various types of equipment, such as presses, collators and the like, a continuous web 12 of a material, such as paper, fabric or plastic, is fed between the nip of a blade cylinder 10 and a rotary anvil 11. The blade cylinder 10 includes stub shafts 13 which are rotatably journalled in suitable bearings in the machine frame. Rotary anvil 11 is similarly mounted for rotation on an axis parallel to the axis of rotation of the cylinder by means of shafts and bearings (not shown).

Rotary blade cylinder 10 carries a plurality of cutting blades 14 mounted in grooves 15, 16, 17 and 18 in the knife cylinder. The cutting blades, which extend outwardly a small distance beyond the periphery of the cylinder, are aligned so that they extend parallel to the axis of the blade cylinder and rotary anvil transversely to the length of web 12. As shown in FIG. 1, four grooves 15-18 are equally spaced around the circumference of the blade cylinder. It will readily be appreciated that a lesser or greater number of blade receiving grooves can be provided and that a blade can be omitted from one or more grooves if desired.

As is well known in the art, the cutting edge 20 of the blades can be continuous, in which case the blades are effective to sever the web 12 into separate sheets. Alternatively, the cutting edges 20 can be interrupted by a plurality of spaced notches, in which case the web 12 is not severed, but rather is provided with a series of spaced transverse perforations which are subsequently used in folding and tearing the web into individual sheets. As a further alternativer, the blade can be utilized to form score lines in the web.

The present invention is particularly concerned with a construction for mounting the cutting blades 14 upon the knife cylinder and for releasing the blades for insertion of replacement blades. The details of this construction are best shown in FIGS. 1-4.

More particularly, each of the grooves, such as groove 15, for receiving the knife blade, includes two parallel side walls 21 and 22 which extend substantially parallel to a radial line passing through the center of the groove. These parallel side walls are interconnected by a bottom wall 23 which is spaced inwardly from the circumference 24 of the knife cylinder and extends perpendicular to walls 21 and 22.

Blade 14 is adapted to be clamped in its cutting position illustrated in FIG. 3 by means of a retaining bar 25. The retaining bar 25 includes a flat surface and a tapered portion. The retaining bar 25 further includes a front wall 27 facing side wall 21 of the groove.

Front wall 27 of the retaining member includes an upper shoulder 28 and a lower shoulder 30 extending parallel to wall 21. Lower shoulder 30 extends outwardly beyond the plane of shoulder 28 into engagement with wall 21. This shoulder provides an upper support ledge 31 for engagement with the bottom edge 32 of cutting blade 14. It is to be understood that knife blade 14 is preferably an accurately dimensioned blade in which bottom edge 32 and cutting edge 20 are parallel. Front wall 27 of retaining member 26 further includes a relieved center section 33 including a wall 39 which slopes outwardly from upper shoulder 28 toward lower shoulder 30. A groove 35 is disposed between the lower shoulder and the lower end of wall 34.

When the blade 14 is clamped in cutting position as illustrated in FIG. 3, lower shoulder 30 abuts wall 21 of the groove. Blade 14 rests upon the support shelf 31 of the lower shoulder. The blade is clamped against wall 21 by means of upper shoulder 28 which presses against the blade and the lower edge of intermediate wall 34 which engages the lower portion of the blade.

The blade clamping force is supplied by a plurality of coil springs 36 which are mounted in a plurality of circular bores 37 formed in the rear wall 38 of clamping member 26. As best shown in FIG. 3, a clearance space is provided between rear wall 28 of the retaining bar and adjacent side wall 22 of groove 15. This clearance space is sufficient to permit pivotal movement of the etaining bar 25 toward wall 22.

As best shown in FIGS. 3 and 4, the bottom wall 40 of the retaining bar 25 includes a slightly rounded edge 41 at the juncture of the front of lower shoulder 30. The bottom wall includes a pivot section 42 extending rearwardly from edge 41 in general parallelism with bottom wall 23 of the groove. The bottom wall 40 of retaining bar 25 further includes an upwardly sloping wall section 43 which provides a clearance space 44 between the retaining clamp and the lower wall of the groove adjacent to the rear of the retaining bar. It is to be understood that if required to compensate for machining inaccuracies or tolerances, a shim of, for example, 0.0020" or 0.0040" in thicknenss can be inserted between pivot section 42 and bottom wall 43 to insure proper cutting action of the blade. Clearance space 44, in combination with the clearance provided between the retaining bar and wall 22, permits rearward pivotal motion of the retaining bar in a clockwise direction as viewed in FIGS. 3 and 4 about pivot wall section 42 of the clamping bar. When the clamping bar is pivoted to the release position shown in FIG. 4, cutting blade 14 is free to be lifted upwardly and removed from slot 15.

This pivotal motion of retaining bar 25 against the compressive force of springs 36 is achieved by means of an operating lever 45 illustrated in FIGS. 1, 3 and 4. As there shown, operating lever 45 includes an elongated member 46 which supports pins 47 and 48. These pins are adapted to be received in vertical bores 50 and 51 provided in the outer wall 26 of the retaining bar 25. The operating lever also includes an outwardly extending handle section 52 mounted upon elongated bar 46 for applying a force to rotatepins 47 and 48 to cant the retaining bar as shown in FIG. 4.

In order to support the retaining bar 25 against dislodgement from knife cylinder 10, each end of the retaining bar is engaged by an L-shaped clamping bracket 55. As shown in FIGS. 1 and 2, clamping bracket 55 includes a radial arm 56 and an outer arm 57 extending at right angles thereto. A clamping bracket 55 is rigidly mounted in each end of a groove, such as groove 15, with the end of arm 56 in abutment with bottom wall 23 of the groove. The clamping bracket is held in position by means of a bolt 58 which threadably engages a threaded opening 60 in the bottom wall of the groove 15. The outer arm 57 of the clamping bracket overlies a longitudinal shoulder 61 formed on the end of retaining bar 25, the endwise outer portion of the clamping bar being cut away to form shoulder 61 and an end wall 62. A resilient pad 63 is interposed between arm 57 and shoulder 61 to permit limited pivotal movement of the retaining bar illustrated in FIG. 4. It is to be understood that the length of cutting blade 14 corresponds to the length of the retaining bar 25 between walls 62. Thus, when cutting blade 14 is inserted in groove 15, it terminates between arms 47 and, hence, can be freely inserted and removed from groove 15 without interference with clamping members 55.

In operation, a blade 14 is inserted in groove 15 by first inserting pins 47 and 48 of the operating tool in openings 50 and 51 of retaining bar 25. The retaining bar is then pivoted in a clockwise direction as shown in FIG. 4 to permit blade 14 to be inserted in the space between front wall 27 of the retaining bar and wall 21 of the housing. The blade is pressed inwardly until its bottom edge 32 rests upon support ledge 31 of the retaining member. When the blade has been properly positioned, the operating handle is moved in a counterclockwise direction and is disengaged from the retaining bar. The force of coil springs 36 is thus effective to force the retainer bar against blade 14 to hold the blade tightly clamped between the front face of the retaining bar and wall 21.

When the blade requires replacement, the procedure is reversed. The pins 47 and 48 of operating lever 45 are again engaged in the openings 50 and 51 of retaining blade 25. The operating lever is shifted in a clockwise direction to pivot the retaining bar 25 to the release position shown in FIG. 4. Cutting blade 14 is raised to remove it from groove 15 and a new blade is inserted. The new blade is locked in place by shifting the operating lever counterclockwise and disengaging it from the retaining bar 25 as before.

From the above disclosure of the general principles of the present invention and the preceding description of a preferred embodiment, those skilled in the art will readily comprehend the various modifications to which the invention is susceptible. Therefore, I desire to be limited only by the scope of the following claims.

Having described my invention, I claim:

1. A blade cylinder assembly comprising:

a cylindrical member having an axis, means mounting said cylindrical member for rotation about said axis;

said cylindrical member having a periphery and a peripheral groove therein extending substantially parallel to said axis;

said groove having first and second side walls and a bottom wall;

an elongated blade having an outer cutting edge and a bottom edge disposed parallel to said cutting edge, said blade being disposed within said groove in contact with said first side wall, said blade extending in a substantial radial direction relative to said cylindrical member, the cutting edge of said blade protruding beyond the periphery of said cylindrical member;

an elongated retainer bar mounted within said groove for releasably retaining said blade immovable within said groove;

said retainer bar including means for engaging and supporting the bottom edge of said blade and a front wall for engaging said blade to force it against said first side wall of said groove, said retainer bar being spaced from said second wall; and spring means engaging said second side wall of said groove and said retainer bar for urging said retainer bar against said blade to hold said blade in a fixed position, said retainer bar further comprising a bottom wall including a first portion in engagement with said bottom wall of said groove and a second portion spaced from said bottom wall of said groove whereby said retainer bar is pivotable away from said first wall to permit removal of said blade.

2. The blade cylinder assembly of claim 1 further comprising retaining clamp means rigidly mounted in opposite ends of said groove, a resilient member interposed between said retainer bar and said retaining clamp means for preventing outward radial movement of said retainer bar, but permitting limited pivotal movement thereof.

3. The blade cylinder assembly of claim 1 in which said second portion comprises has a narrowing taper in a direction away from said first wall to provide clearance between said bottom wall and said retainer bar adjacent to said second wall.

4. The blade cylinder assembly of claim 3 in which said retainer bar further comprises an outer wall and a rear wall spaced from the second wall of said groove.

5. The blade cylinder assembly of claim 1 in which said retainer bar further comprises an outer wall and a rear wall spaced from the second wall of said groove.

6. The blade cylinder assembly of claim 4 further comprising bores in the rear wall of said retainer bar, said spring means comprising compression springs disposed within said bores and engaging the second wall of said groove.

7. The blade cylinder assembly of claim 1 in which said front wall of said retainer bar comprises an upper shoulder in engagement with said blade, and a lower shoulder forming said means for engaging and supporting said bottom edge of said blade and a recessed intermediate section.

8. The blade cylinder assembly of claim 7 in which said intermediate section is tapered and engages said blade above said lower shoulder.

9. The blade cylinder assembly of claim 1 further comprising a lever member releasably engageable with said retainer bar for pivotally moving said retainer bar.

10. The blade cylinder assembly of claim 9 in which said retainer bar comprises an outer wall, openings in said outer wall, and said lever member including projections insertable in said openings, and a handle portion.

* * * * *